US008991621B2

(12) United States Patent
Harwell et al.

(10) Patent No.: US 8,991,621 B2
(45) Date of Patent: Mar. 31, 2015

(54) ENERGY DIFFUSING WEAR RING AND METHODS THEREOF

(75) Inventors: Travis Harwell, Tucson, AZ (US); Robert G. Moorhead, Bethlehem, PA (US)

(73) Assignee: Flsmidth A/S (DK)

( * ) Notice: Subject to any disclaimer, the term of this patent is extended or adjusted under 35 U.S.C. 154(b) by 0 days.

(21) Appl. No.: 14/238,594

(22) PCT Filed: Aug. 10, 2012

(86) PCT No.: PCT/US2012/050275
§ 371 (c)(1),
(2), (4) Date: Feb. 12, 2014

(87) PCT Pub. No.: WO2013/025472
PCT Pub. Date: Feb. 21, 2013

(65) Prior Publication Data
US 2014/0205429 A1    Jul. 24, 2014

Related U.S. Application Data

(60) Provisional application No. 61/522,986, filed on Aug. 12, 2011.

(51) Int. Cl.
*B04C 11/00* (2006.01)
*B04C 5/085* (2006.01)
(Continued)

(52) U.S. Cl.
CPC .......... *B04C 11/00* (2013.01); *Y10T 29/49826* (2015.01); *B04C 5/085* (2013.01);
(Continued)

(58) Field of Classification Search
CPC .......... B04C 11/00; B04C 5/08; B04C 5/085; B04C 5/087; B04C 5/10; B04C 7/00; B04C 11/10; F04D 29/026; F04D 29/406; F16J 15/16; F16J 15/447; F16J 15/106; F16J 15/102; F16J 15/062; F16J 15/104; F16J 15/12; F16J 15/126; F16J 15/453; B29C 45/14; F16L 23/18; Y10T 29/49826

See application file for complete search history.

(56) References Cited

U.S. PATENT DOCUMENTS 3,279,972 A * 10/1966 Thassy .......................... 428/223
4,400,267 A *  8/1983 Brose ............................ 209/727

(Continued)

FOREIGN PATENT DOCUMENTS

WO     WO 2009158101 A1 * 12/2009
WO     WO2010/085331          7/2010
WO     WO 2010085331 A1 *  7/2010

OTHER PUBLICATIONS

The International Search Report and Written Opinion dated Oct. 16, 2012, 9 pages.

(Continued)

*Primary Examiner* — David C Mellon
(74) *Attorney, Agent, or Firm* — Jeffrey A. Sharp; Aaron M. Pile; Matthew R. Weaver

(57) ABSTRACT

An energy diffusion sealing ring [872] for use with a hydrocyclone or pump is provided. The energy diffusion sealing ring [872] comprises a sacrificial suspension matrix [872A] comprised of a polymer, elastomer, or combination thereof, and a number of packed inserts [872B] suspended in the matrix [872]. The matrix [872] serves as delivery means for the inserts [872B] into one or more recessed portions [833, 841]. The inserts [872B] comprise a hard material (e.g., ceramic or carbide) and form wear bodies which slow and dissipate kinetic energy of escaping slurry by way of creating paths of resistance. As the suspension matrix [872A] erodes over time, a plurality of interstices [872C] between the inserts [872B] are formed. Escaping slurry [852] slows as it traverses three-dimensional serpentine paths defined by said interstices [872C], thereby reducing its potential to wear surrounding components. Methods for manufacturing an energy diffusion sealing ring [872] and for dissipating the energy of slurry [850] are also disclosed.

10 Claims, 13 Drawing Sheets

(51) Int. Cl.
  *B04C 5/08* (2006.01)
  *B29C 45/14* (2006.01)
  *F16J 15/16* (2006.01)
  *F04D 29/02* (2006.01)
  *F04D 29/40* (2006.01)
  *F16J 15/06* (2006.01)
  *F16J 15/10* (2006.01)
  *F16L 23/18* (2006.01)
  *F16J 15/447* (2006.01)

(52) U.S. Cl.
  CPC ............. *F16J 15/062* (2013.01); *F16J 15/102* (2013.01); *F16J 15/106* (2013.01); *F16L 23/18* (2013.01); *B04C 5/08* (2013.01); *F16J 15/447* (2013.01); *B29C 45/14* (2013.01); *F04D 29/026* (2013.01); *F04D 29/406* (2013.01); *F16J 15/16* (2013.01)
  USPC ..................................................... 210/512.1

(56) References Cited

U.S. PATENT DOCUMENTS

| | | | | |
|---|---|---|---|---|
| 4,463,959 | A * | 8/1984 | Usher et al. | 277/608 |
| 4,623,458 | A * | 11/1986 | Hakola | 210/238 |
| 4,765,887 | A * | 8/1988 | Lister | 209/727 |
| 4,793,925 | A * | 12/1988 | Duvall et al. | 210/512.1 |
| 4,915,579 | A | 4/1990 | Whittier et al. | |
| 4,956,090 | A * | 9/1990 | Robinson | 210/512.1 |
| 5,597,628 | A * | 1/1997 | Cetrelli et al. | 428/34.6 |
| 5,667,224 | A * | 9/1997 | Streckert et al. | 277/634 |
| 5,819,955 | A | 10/1998 | Clarke | |
| 5,868,260 | A * | 2/1999 | Bosman et al. | 209/725 |
| 6,096,121 | A * | 8/2000 | Millas | 96/208 |
| 2005/0103691 | A1* | 5/2005 | Hakola | 209/715 |
| 2011/0101627 | A1* | 5/2011 | Labrenz et al. | 277/630 |

OTHER PUBLICATIONS

The European Search Report and Written Opinion date Jul. 21, 2014, 9 pages.

* cited by examiner (FIG. 14B)

ENERGY DIFFUSING WEAR RING AND METHODS THEREOF

CROSS-REFERENCE TO RELATED APPLICATIONS

This application is a PCT international application which claims priority to U.S. provisional application No. 61/522,986 filed on Aug. 12, 2011.

FIELD OF THE INVENTION

This invention relates to consumable seals for equipment used in industrial, waste, coal, aggregate, and minerals processing technologies, and more particularly to energy-diffusing wear-resistant technologies for hydrocyclones, slurry pumps, and related apparatus.

BACKGROUND OF THE INVENTION

The practice of using a hydrocyclone to concentrate and separate coarser-sized particles in a particle-laden aqueous suspension has been practiced for over 100 years; however, the duty of industrial hydrocyclones has been significantly expanded over time. Today, particularly in mineral processing applications, high feed rates of solids and the abrasive nature of these particles requires that hydrocyclones be refined and improved to achieve higher capacities, greater solids recovery, and longer service life.

An important aspect of hydrocyclone operational kinetics which affects service life is the fact that rotating flow inside an operating hydrocyclone obeys the laws of free-vortex rotation. In other words, the rotating velocities (tangential velocities) within an industrial hydrocyclone increase as the radius of the hydrocyclone decreases. Mathematically, this condition of "free vortex" is expressed by the equation: "VR=constant", wherein "V" equals slurry velocity, and "R" equals the radius of the hydrocyclone at a given point. Thus, as slurry rotates and descends toward the bottom of a hydrocyclone, it encounters decreasing radius and increasing velocity.

To satisfy the free-vortex equation, slurry must accelerate tangentially in order to maintain a constant result. For example, if slurry enters a 24 inch diameter hydrocyclone fitted with a 4 inch diameter apex orifice with a linear velocity of 25 feet per second, then slurry descending towards the bottom of the hydrocyclone must accelerate to approximately 150 feet per second or increase its tangential velocity approximately 6 times as it encounters a decreasing radius. Since slurry typically contains abrasive particles which can erode interior portions of a hydrocyclone, increased wear is especially prevalent in areas with smaller inner diameters.

To date, hydrocyclone designers have used various approaches including utilizing internal liners constructed of abrasion-resistant materials. In many instances, such an approach requires a multiple-piece hydrocyclone body. FLSmidth Krebs pioneered this concept of "componentized hydrocyclone design" 50 years ago. The concept utilizes multiple sections of wear-resistant liners held together in respective steel-housings. Typically, the liners were comprised of a flexible elastomeric material, and therefore, problems accompanying the sealing of joints between each liner section did not exist.

However, in the mid 1970's, when "componentized" cyclones were being used in coal processing, elastomeric liners had a short service life because of the abrasiveness of coal particles. Shortly thereafter, FLSmidth Krebs pioneered the use of abrasion-resistant refractory ceramic liners, which, although providing a more abrasion-resistant hydrocyclone, form slight gaps therebetween due to the non-resilient nature of ceramic material. It was discovered that, unlike elastomeric liners, the gaps at each joint between the rigid ceramic liners permitted some exiting of the rotating slurry suspension within the hydrocyclone, thereby causing premature wear of less abrasion-resistant exterior steel housings.

Since hydrocyclones can be comprised of as many as eight or more sections—with each section having one or more joints, chances are significant that at least one liner joint may succumb to slurry penetration and erosion due to the significant amount of kinetic energy in the rotating slurry.

Through the years, various attempts were made to address slurry erosion in the gaps between ceramic liners. The challenge is that ceramic liners are typically formed by slip casting or isostatic pressing while in a "green" (pre-fired) state, meaning liners need to be sized dimensionally about 15% to 17% larger than the desired final product size (post-firing), depending on material composition. These significant shrinkage rates attributable to kiln-firing lead to non-uniformities which make it extremely difficult to close tight joint gap tolerances between ceramic liners—particularly with oddly sized or shaped liners. Moreover, tightening of tolerances for the casting, pressing, and firing steps would lead to higher manufacturing costs and a non-competitive design in the marketplace.

More recent attempts have incorporated the concept of a labyrinth seal or a half lap joint type arrangement built-in to each end of the ceramic liners. An example of such a design can be seen in International Patent Application Publication WO10085331. However, independent tests suggest that inter-fitted ceramic liners incorporating such mechanical interlocks are extremely vulnerable to damage, since ceramic margins generally extend past the respective casing flange. Moreover, such interfaces introduce a level of stress concentration. Thus, the reliance on traditional labyrinth seals creates a vulnerable ceramic part with a poor resistance to impact. Additionally, higher density abrasive particles have a tendency to orbit in middle and lower sections of a hydrocyclone, further increasing the chance of lap joint failure from orbiting tramp material.

Conventional seals and gaskets commonly used in hydrocyclones are typically made of a solid elastomeric compound such as a urethane or neoprene. The problem with these conventional sealing devices is that they fail to hold up to demanding environments, particularly environments where the sealing devices are subjected to abrasive slurries at high velocities or pressures. Moreover, traditional mechanical interfaces which incorporate seals and gaskets fail to effectively prevent casing blowout as described above. The aforementioned drawbacks are also prevalent in slurry pumps and upper regions of a hydrocyclone, where abrasive slurries under high pressures and/or velocities may escape between components over time. For example, other high wear areas include areas adjacent the vortex finder in a hydrocyclone and areas in slurry pumps adjacent dry glands seals, pump casings, back plates, and hubs.

For example, in a typical hydrocyclone having one or more bolted-together cone sections, a plurality of modular ceramic liner sections protect the inner surfaces of casings which define the outer hydrocyclone housing. Small axial spaces typically exist between the respective mating surfaces of the ceramic liner sections. Slurry passing through these small axial spaces may have large radial velocities and kinetic energy, and can quickly erode both the mating surfaces of the ceramic liners and adjacent portions of the surrounding casings—including flanged connections and external connectors. Such erosion can lead to spewing, leaks, premature maintenance, and other problems with the hydrocyclone. Since abrasive wear from a particle-laden suspension typically increases at approximately the cube of velocity, it is extremely desirable to slow the velocity of slurry in areas of a hydrocyclone which are not protected with wear surfaces.

OBJECTS OF THE INVENTION

It is, therefore, an object of the invention to provide an improved wear-resistant sealing junction for hydrocyclones and slurry pump components;

It is another object of the invention to provide a method of quickly diffusing high energies and velocities of abrasive slurry to reduce erosion of surrounding components.

Yet another object of the invention is to minimize scheduled and unscheduled maintenance and maximize operation time of equipment at little cost.

Another object of the invention is to maximize the safety and performance of hydrocyclones, slurry pumps, and other processing equipment requiring robust seals.

Another object of the invention is to provide a replaceable sealing wear element which will work to prevent erosion even after a substantial portion of the wear element erodes away.

It is another object of the invention to provide a replaceable sealing wear element retrofit kit which is compatible with existing conventional hydrocyclone and/or slurry pump units.

Another object of the invention is to arrest joint and connection erosion in ceramic-lined hydrocyclones, particularly in areas adjacent to the vortex finder, cone section flanges, and cylinder flanges.

Yet another object of the invention is to arrest joint and connection erosion in slurry pumps, particularly in areas adjacent to the dry glands seals, pump casings, back plates, and hubs.

These and other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

The present invention utilizes an approach that permits some penetration of abrasive slurry between ceramic liner sections to some extent, so long as the slurry can be quickly arrested by a secondary barrier to protect less wear-resistant housing materials behind it. In some embodiments, a resilient urethane-based casing is directly cast molded to the outside of a preformed refractory/ceramic liner, thereby making an integral single corrosion-resistant housing portion. This process reduces the number of required parts to form a hydrocyclone. Since urethane is more vulnerable to erosion, steel housings may be employed.

An annular energy diffusion sealing ring for a hydrocyclone or slurry pump is disclosed. According to some embodiments, the sealing ring may comprise a resilient suspension matrix comprised of at least one of a polymer or elastomer and a plurality of closely-spaced or closely-packed hard inserts suspended within said matrix. In some instances, the inserts are formed of a ceramic or carbide material and the matrix comprises a silicone, urethane, or other form of rubber.

The energy diffusion sealing ring may be received in a complementary shaped annular receiving portion within the hydrocyclone or slurry pump. A kit for refurbishing a hydrocyclone is also disclosed, wherein a first annular energy diffusion sealing ring is configured for sealing an upper side of a hydrocyclone cone section having a larger diameter, and wherein the second annular energy diffusion sealing ring is configured for sealing a lower side of a hydrocyclone cone section having a smaller diameter.

A hydrocyclone comprising an annular energy diffusion sealing ring is also disclosed. The hydrocyclone comprises a first section having a casing, a second section having a casing, and at least one receiving portion which receives the annular energy diffusion sealing ring. The ring comprises a resilient suspension matrix comprised of at least one of a polymer or elastomer and a plurality of closely-spaced or closely-packed hard inserts suspended within said matrix.

A slurry pump having a drive shaft, impeller, pump casing, and a back plate or hub further comprises an annular receiving portion which provides seating for the annular energy diffusion sealing ring. The ring comprises a resilient matrix which contains at least one of a polymer or elastomer and a plurality of closely-spaced or closely-packed hard inserts suspended within said resilient matrix.

A method of reducing wear in a hydrocyclone or pump is further disclosed. The method involves providing at least one annular receiving portion in a first component which is adjacent to a second component, providing an annular energy diffusion sealing ring in said at least one annular receiving portion, the annular energy diffusion sealing ring comprising at least one of a polymer or elastomer and a plurality of closely-spaced or closely-packed hard inserts; allowing slurry to wear away portions of the polymer or elastomer thereby forming a plurality of interstices between the inserts; and, diffusing energy of slurry moving between the first and second components via paths of resistance created by said plurality of interstices.

A method of manufacturing a hydrocyclone is also disclosed. The method involves providing a first section and casing; providing a second section and casing; providing at least one receiving portion; inserting an annular energy diffusion sealing ring into said at least one receiving portion, and then assembling the first and second sections together to capture said annular energy diffusion sealing ring in said at least one receiving portion between the first and second section.

Several methods of manufacturing an energy diffusion sealing ring are also provided. For example, energy diffusion sealing rings may be formed by packing inserts tightly together in a ring-shaped mold cavity, and filling the cavity with uncured polymer or elastomer to suspend the inserts. The uncured polymer or elastomer is then cured to capture the inserts in the matrix. In some embodiments, packing of inserts is performed prior to filling, and in other embodiments, filling may be performed before packing In some embodiments, the ring is formed "in-situ" by applying uncured polymer or elastomer to an annular receiving portion in a hydrocyclone or pump. Yet in other embodiments, inserts may be packed simultaneously with filling, wherein inserts are fed into the ring-shaped mold cavity as the cavity is being filled with uncured polymer or elastomer. Alternatively, the inserts may be pre-mixed with an uncured polymer or elastomer prior to injecting the mix into the ring-shaped mold cavity.

DETAILED DESCRIPTION OF THE INVENTION

Figure 1:
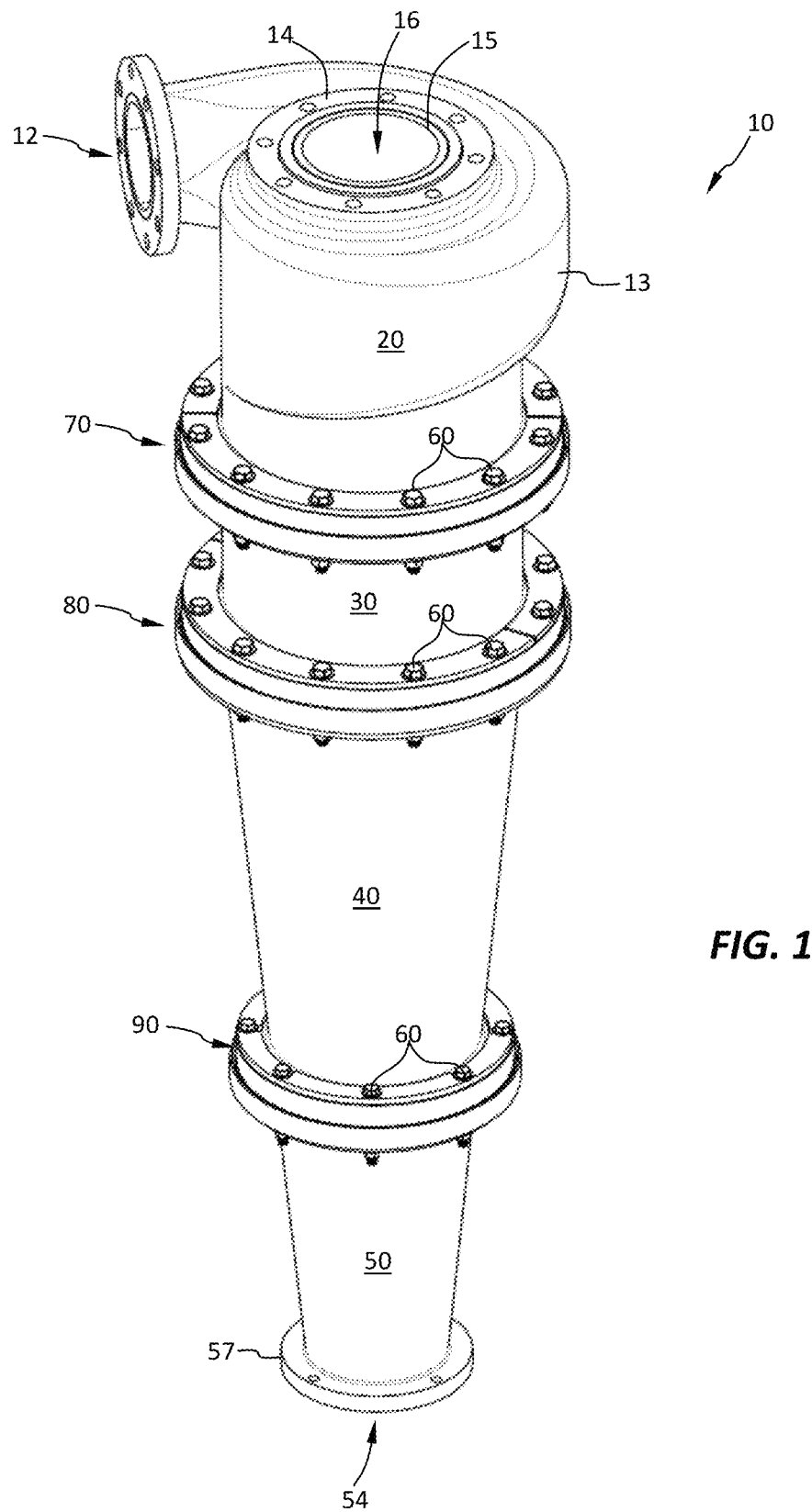
FIG. 1 illustrates a hydrocyclone according to some embodiments.

FIGS. 1-6 depict a hydrocyclone 10 according to some embodiments. The hydrocyclone 10 comprises an inlet 12 for delivery of a slurry feed to be separated. Inlet 12 is part of an inlet head 20 located at an upper region of the hydrocyclone 10. Below the inlet head 20 may be attached one or more cylinders 30 and/or cone sections 40, 50. For example, a first cone section 40 and a second cone section 50 may be provided below a single cylinder 30 as shown. The cone sections 40, 50 may taper down as they approach a lower region of the hydrocyclone 10 as shown.

In use, slurry fines entering the inlet 12 traverse a volute portion 13 and eventually exit an overflow exit port 16 defined by a vortex finder 15. Conversely, heavies and course particles in the slurry feed exit the hydrocyclone 10 through an underflow exit port 56 located in or otherwise defined by a bottom-most cone section 50. The underflow exit port 56 may comprise a flange 57 or equivalent structure for connecting to piping, a splash skirt, an underflow launder, or other device. The vortex finder 15 may attach to the inlet head 20 via a vortex finder flange 14. The flange 14 may be integrally formed (e.g., machined, molded, casted, monolithic) with the vortex finder, or the flange 14 may be formed of a separate material and subsequently joined the vortex finder 15 by pressing, adhesive, or other means known in the art. In a preferred embodiment, the vortex finder 15 may be comprised of a ceramic material, whereas the flange 14 comprises a metallic substrate. A gasket 19 may be provided between an upper flange 25 on the inlet head 20 and said vortex finder flange 14 to prevent leakage. A backing ring 11 may also be provided to provide support and center the vortex finder 15 within the inlet head 20.

In the particular embodiment shown, the backing ring 11 comprises an annular recess in which an energy diffusion sealing ring 17 may be disposed. The sealing ring 17 is wear-resistant and is designed to dissipate energy within high velocity slurries and particles, thereby preventing premature erosion of gasket 19, flange 25, inlet head casing 24, and backing ring 11. In some embodiments, the sealing ring 17 may comprise a polymer, elastomer, or combination thereof and a number of wear-resistant inserts. For example, sealing ring 17 may include a urethane, rubber, or neoprene impregnated with or co-molded with a dense packing of ceramic inserts contained therein. As shown, the sealing ring 17 may comprise a depending lower lip portion which fits concentrically between an upper surface 28 of an inlet head liner 22 and the vortex finder 15. Though not expressly shown, it will be appreciated by those of ordinary skill in the art that other cross-sectional geometries and centering features may be employed by sealing ring 17.

Since insertion areas surrounding the vortex finder 15 generally require clearances with respect to the inlet head liner 22 in order to permit the removal and installation of differently-sized vortex finders used for different processes, particles (particularly coal particles) orbiting in close proximity to the vortex finder 15 may exit the hydrocyclone 10 via said clearances in the insertion areas surrounding the vortex finder 15. This phenomenon can result in premature wearing of flange 25 and other portions of the casing 24 in upper regions of the cyclone 10, particularly between the inlet head liner 22 and vortex finder 15. The adaptability and compressibility of the flexible energy-diffusion sealing ring 17 provides an improved manner in which to seal vortex finder insertion areas without necessarily requiring permanent cementation of the vortex finder 15 in the hydrocyclone 10.

The inlet head liner 22 serves to protect the softer inlet head casing 24 from abrasive slurries within the hydrocyclone 10. A bottom portion of the inlet head casing 24 comprises an inlet head lower flange 27 configured to assemble with a cylinder 30 or cone section 40, 50. The inlet head lower flange 27 comprises a receiving portion 23 configured to receive an upper portion of a complementary-shaped first connection energy diffusion sealing ring 72.

Figure 4:
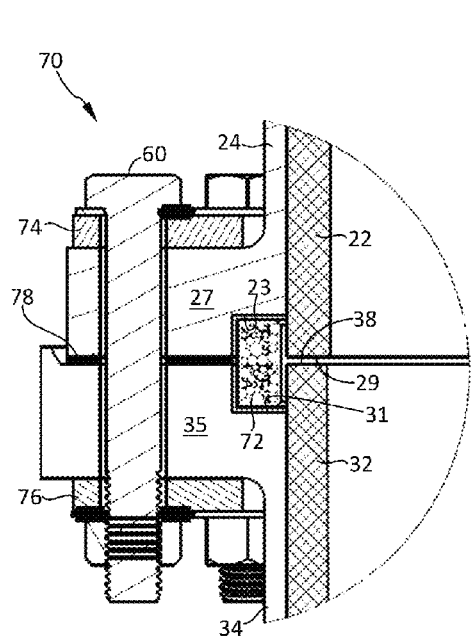
FIGS. 4-6 are detailed cross-sectional views showing the particulars of first, second, and third connections shown in FIG. 2, respectively.

In the particular embodiment shown in FIGS. 1-6, a cylinder 30 is mounted to the inlet head 20 via a first connection 70 which comprises a cylinder upper flange 35 and the inlet head lower flange 27. As best seen in FIG. 4, the upper flange 35 comprises a receiving portion 31 which is configured to receive a lower portion of a complementary-shaped first connection energy diffusion sealing ring 72. The sealing ring 72 serves to diffuse energy in slurry escaping between a lower surface 29 of the inlet head liner 22 and an upper surface upper surface 38 of a cylinder liner 32 at high radial velocities and centrifugal forces.

A first connection gasket 78 such as a neoprene gasket may be placed between the inlet head lower flange 27 and the cylinder upper flange 35 in order to further seal the inlet head 20 to the cylinder 30. The first connection gasket 78 is protected from slurry escaping between surfaces 29 and 38 by the energy diffusion sealing ring 72. An upper backing plate 74 and a lower backing plate 76 are provided on opposing sides of the inlet head lower flange 27 and cylinder upper flange 35, respectively, in order to maintain clamping forces between the cylinder 30 and the inlet head 20. A number of fasteners 60 apply the clamping forces to the backing plates 74, 76 thereby pressing the flanges 27, 35 together and compressing the gasket 78.

Figure 5:
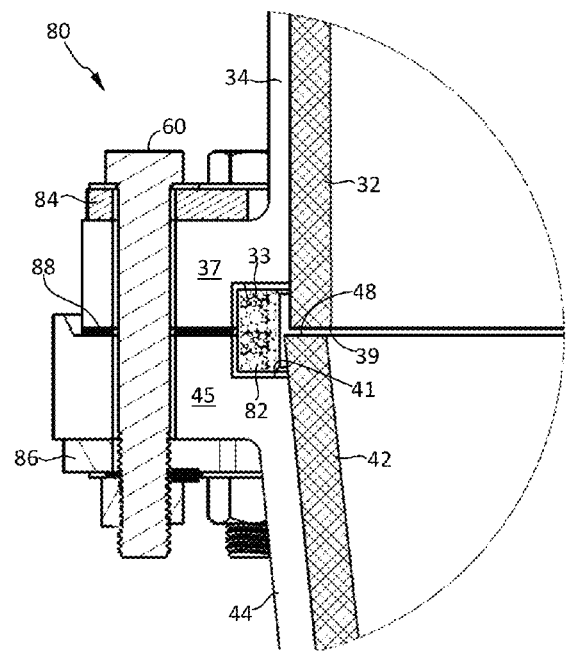

According to FIG. 5, cylinder 30 is mounted to a first cone section 40 via a second connection 80. The second connection 80 comprises a cylinder lower flange 37 and a first cone section upper flange 45. The cylinder lower flange 37 comprises a lower receiving portion 33 which is configured to receive an upper portion of a complementary-shaped second connection energy diffusion sealing ring 82. The first cone section upper flange 45 comprises a first cone section upper receiving portion 41 which is configured to receive a lower portion of a complementary-shaped second connection energy diffusion sealing ring 82. The sealing ring 82 serves to diffuse energy in slurry escaping between a lower surface 39 of the cylinder liner 32 and an upper surface 48 of a first cone section liner 42 at high radial velocities and centrifugal forces. The cylinder liner 32 serves to protect a cylinder casing 34 from abrasive slurries within the hydrocyclone 10 and the first cone section liner 42 serves to protect the first cone section casing 44 from abrasive slurries within the hydrocyclone 10.

A second connection gasket 88 (for example, a neoprene gasket) may be placed between the cylinder lower flange 37 and the first cone section upper flange 45 to seal the first cone section 40 to the cylinder 30. The second connection gasket 88 is protected from slurry escaping between surfaces 39 and 48 by the second connection energy diffusion sealing ring 82. An upper backing plate 84 and a lower backing plate 86 are similarly provided on opposing sides of the cylinder lower flange 37 and first cone section upper flange 45. A plurality of fasteners 60 apply clamping forces to the backing plates 84, 86 thereby pressing the flanges 37, 45 together and compressing the gasket 88.

Figure 6:
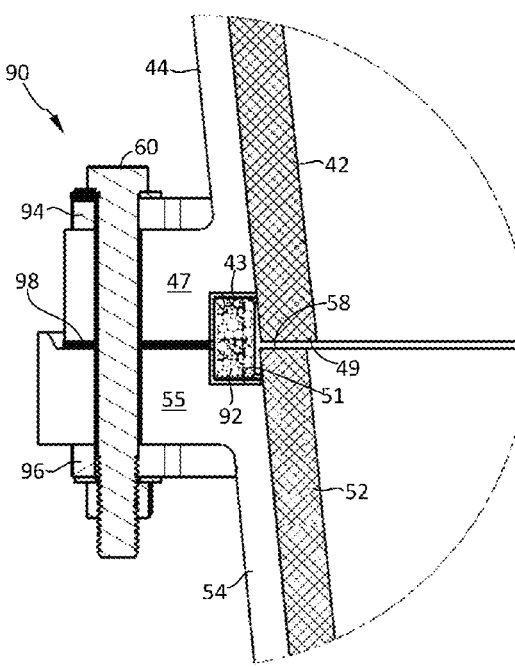
Figure 7A:
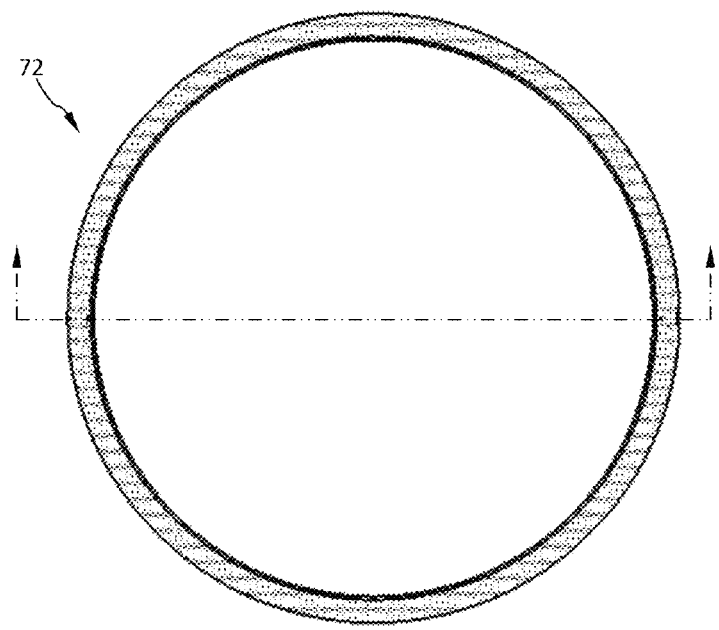
FIGS. 7A-7D illustrate an energy-diffusion sealing ring according to the embodiment which is shown in FIGS. 2 and 4.
Figure 7B:
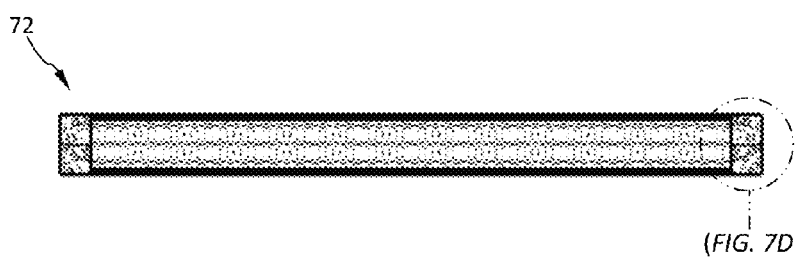
Figure 7C:
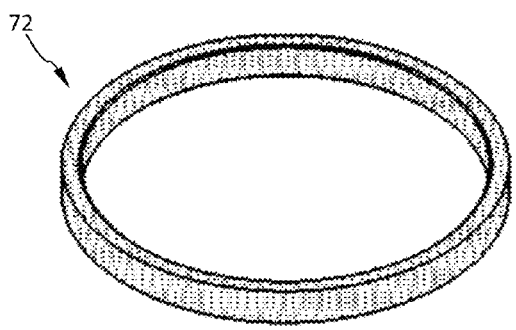
Figure 7D:
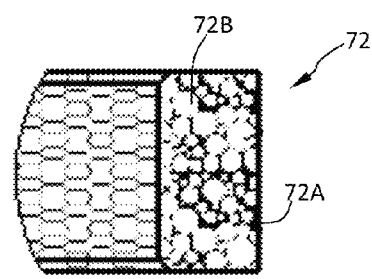
Figure 8A:
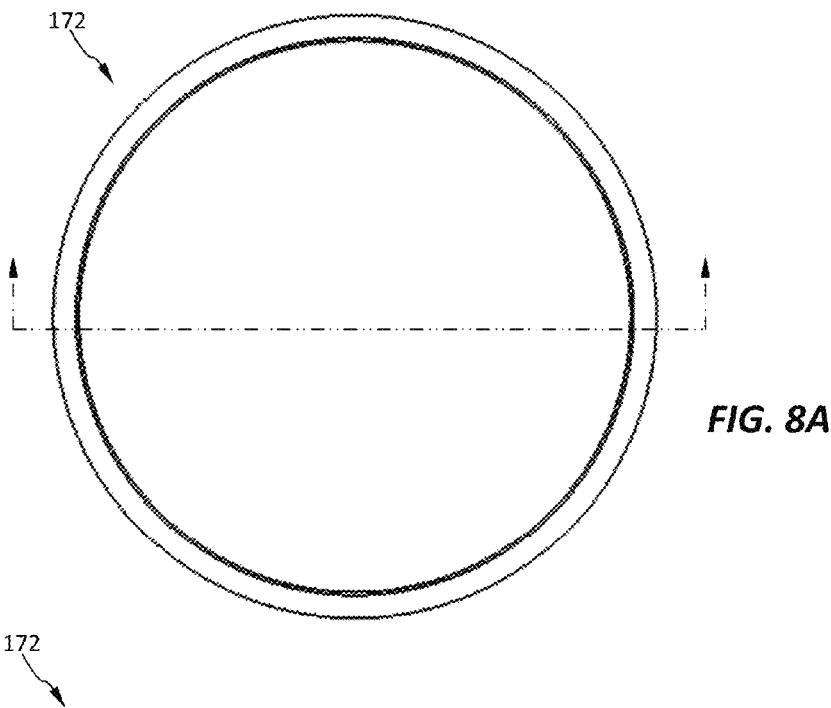
FIGS. 8A-8D illustrate an energy-diffusion sealing ring according to other embodiments.
Figure 8B:
Figure 8C:
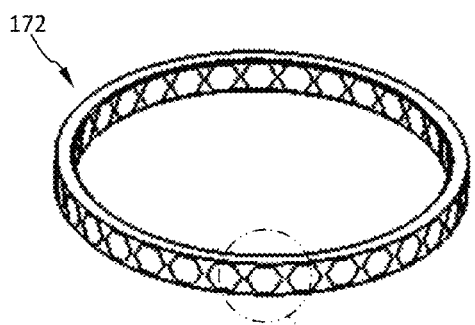
Figure 8D:
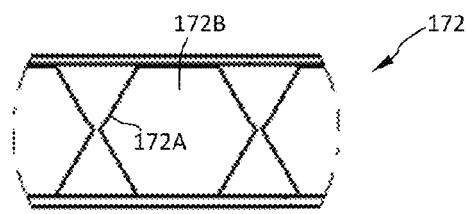

According to FIG. 6, a second cone section 50 is mounted to the first cone section 40 via a third connection 90. The third connection 90 comprises a first cone section lower flange 47 and a second cone section upper flange 55. The first cone section lower flange 47 comprises a lower receiving portion 43 which is configured to receive an upper portion of a complementary-shaped third connection energy diffusion sealing ring 92. The second cone section upper flange 55 comprises an upper receiving portion 51 which is configured to receive a lower portion of a complementary-shaped third connection energy diffusion sealing ring 92. The sealing ring 92 serves to diffuse energy in slurry escaping between a lower surface 49 of the first cone section liner 42 and an upper surface 58 of a second cone section liner 52 at high radial velocities and centrifugal forces. The second cone section liner 52 serves to protect a second cone section casing 54 made of a softer material from abrasive incoming slurries.

A third connection gasket 98 is placed between the first cone section lower flange 47 and the second cone section upper flange 55 (for example, a neoprene gasket), to seal the second cone section 50 to the first cone section 40. The second connection gasket 98 is protected from slurry escaping between surfaces 49 and 58 by the third connection energy diffusion sealing ring 92. An upper backing plate 94 and a lower backing plate 96 are provided on opposing sides of the first cone section lower flange 47 and second cone section upper flange 55, respectively. A lower receiving portion 53 may be provided to the second cone section 50 adjacent a second cone section liner lower surface 59, in order to accommodate a fourth energy diffusion sealing ring (not shown) or conventional seal or gasket to improve the connection between the hydrocyclone 10 and another device such as a splash skirt, under flow launder, or pipe/tube.

Figure 2:
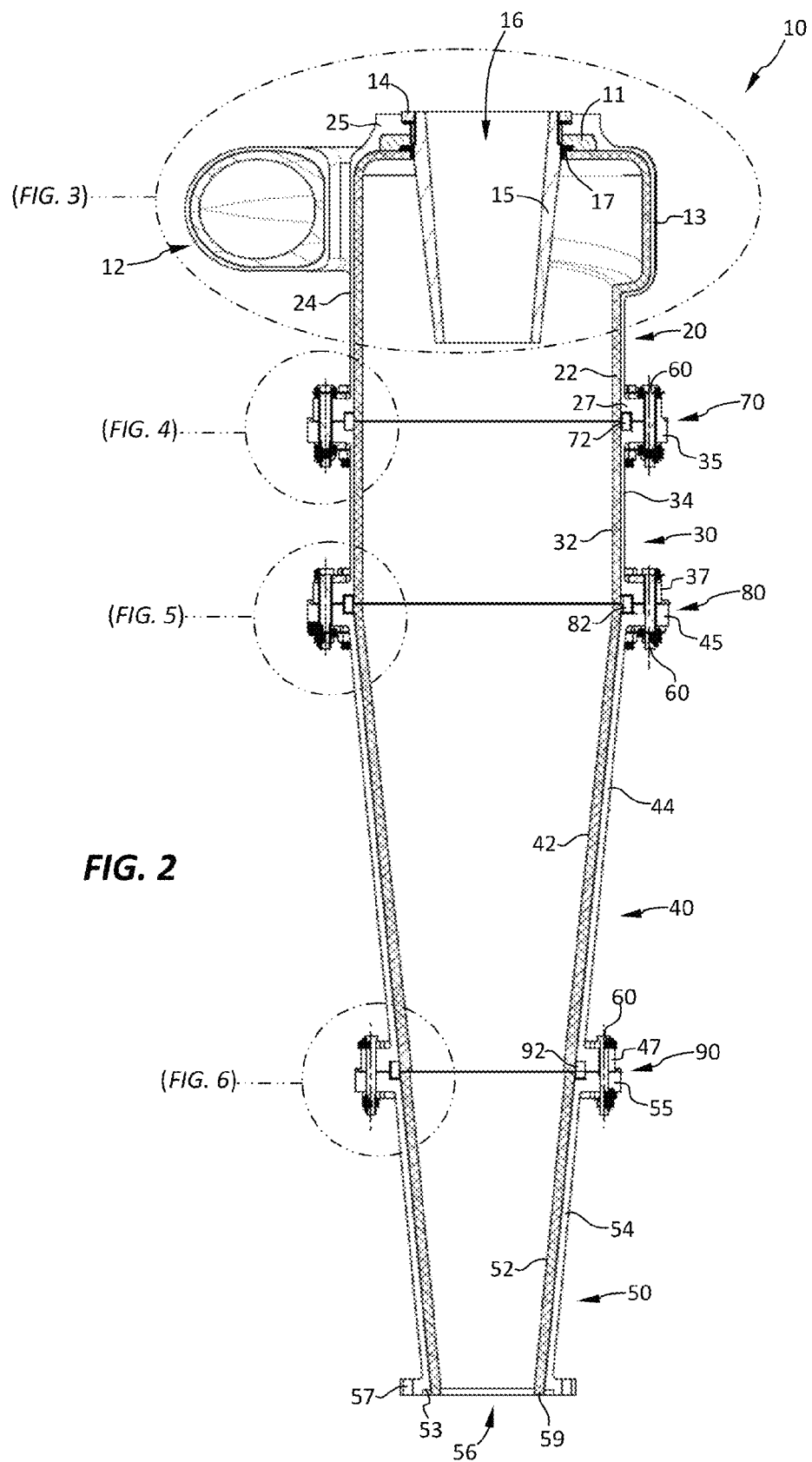
FIG. 2 is a longitudinal cross-section of the hydrocyclone shown in FIG. 1.
Figure 3:
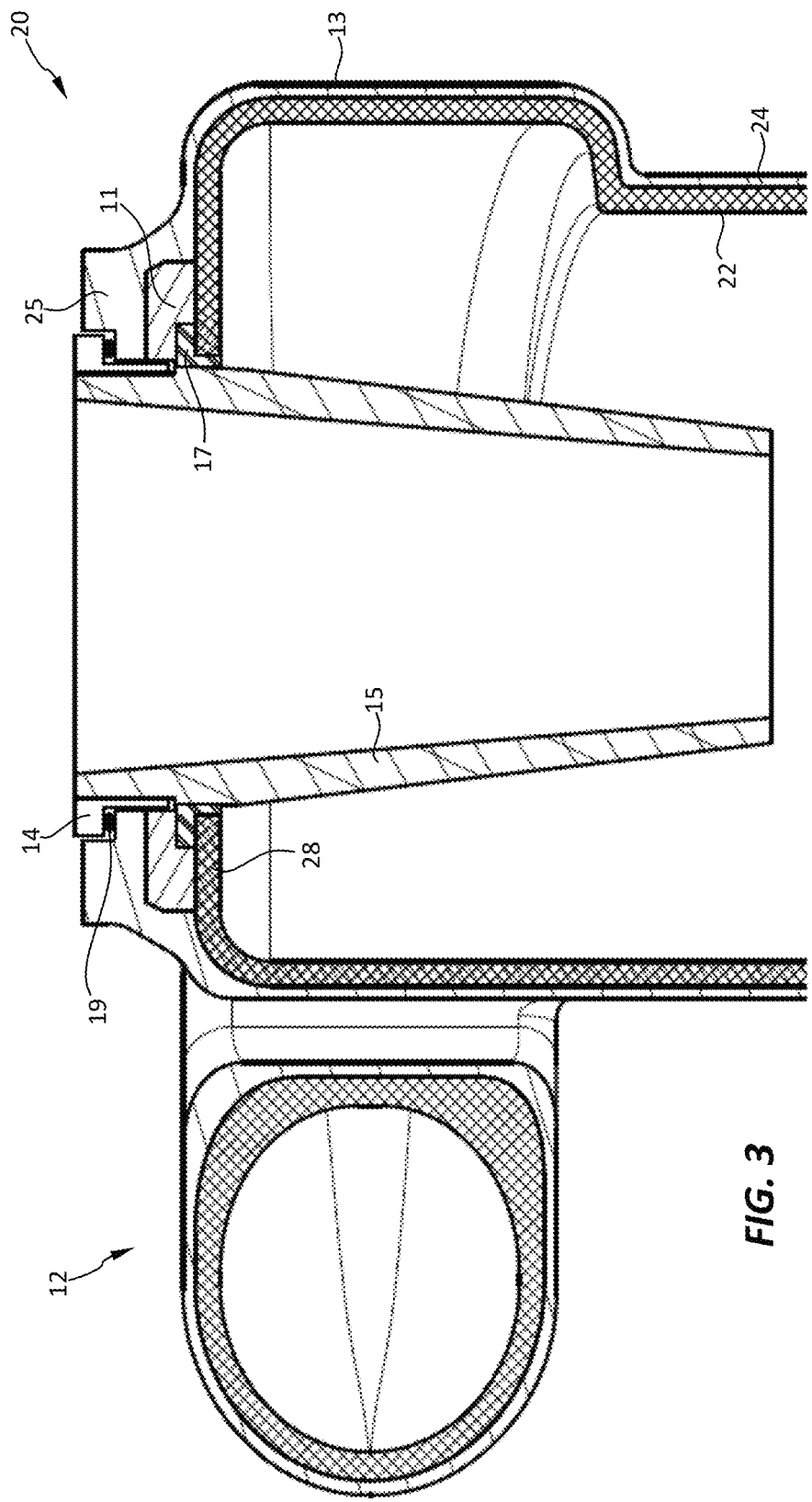
FIG. 3 is a detailed cross-sectional view showing particulars of FIG. 2.
Figure 9:
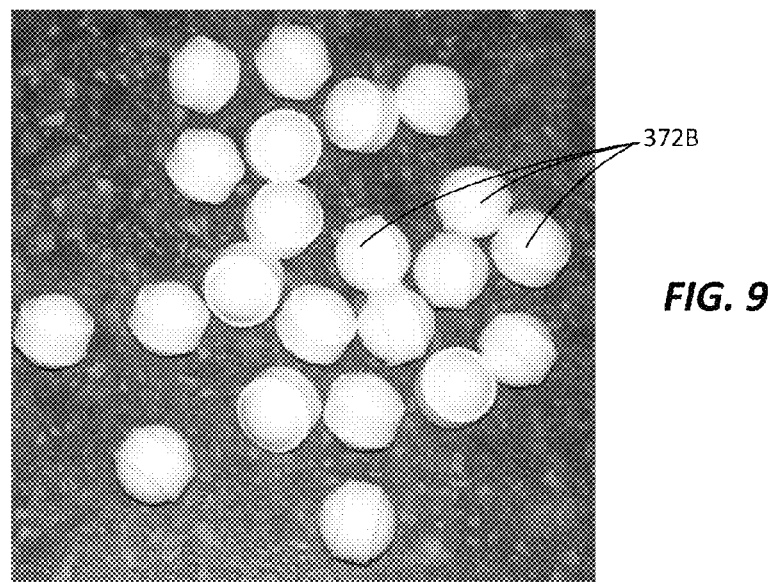
FIG. 9 is a photograph showing one example of inserts which may be used for an energy-diffusion sealing ring.

FIGS. 7A-7D illustrate an energy-diffusion sealing ring 72 according to the embodiment shown in FIGS. 2 and 4. The sealing ring 72 comprises a polymeric or elastomeric suspension matrix 72A and a number of inserts 72B. The inserts 72B are formed of a wear-resistant material such as a ceramic, ceramic composite, carbide (tungsten carbide, high carbon steel), or other material. Though the inserts 72B shown in FIGS. 7A-7D comprise smooth round spheres (e.g., ceramic ball bearings), it should be noted that in some embodiments, inserts 72B may comprise one or more surface textures including ridges, bands, dimples, protuberances, or grooves, and may be provided as, cubes, pyramids, prisms, packing or non-packing polyhedrons (e.g., dodecahedrons), etc. For example, FIG. 9 shows a photograph of inserts 372B having an equatorial band portion.

To form the energy-diffusion sealing ring 372, the inserts 372B are packed together tightly in a ring-shaped mold cavity and then the mold cavity is filled with a urethane or equivalent polymer or elastomer to suspend the inserts 372B in a flexible annular matrix 372A. Alternatively, the inserts 372B are injected into a ring-shaped mold cavity simultaneously with said urethane or equivalent polymer or elastomer to suspend the inserts 372B in a flexible annular matrix 372A. While not shown, the ring 72 may be formed "in-situ" within the receiving portions 23, 31 by filling the receiving portions with a sealant such as RTV silicone pre-mixed with said inserts. Alternatively, the receiving portions 23, 31 may be filled with a sealant and then subsequently, inserts added to the wet sealant prior to hydrocyclone assembly.

The combination of round ceramic inserts 72B with the flexible properties of a softer elastomeric or polymeric matrix 72A provides an erosion resistant sealing ring 72 that can adapt to the dimensional variations of refractory/ceramic liners 24, 34. This insures a tight seal between the sealing ring 72 and the liners 24, 34—thereby ensuring that any slurry exiting the surfaces 29, 38 between liners 24, 34 cannot short-circuit the sealing ring 72. In addition, such a composite ring is capable of diffusing the energy associated with slurry escaping from lined inner portions of the cyclone 10.

Figure 10:
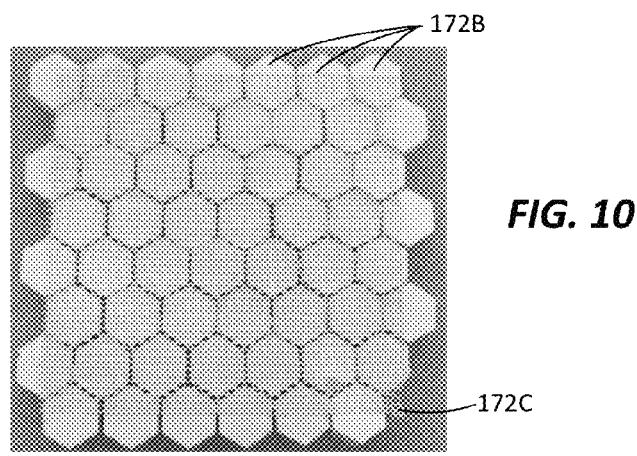
FIG. 10 is a photograph showing inserts for an energy-diffusion sealing ring according to other embodiments.

FIGS. 8A-8D illustrate an energy-diffusion sealing ring 172 according to alternative embodiments. The sealing ring 172 comprises a polymeric or elastomeric suspension matrix 172A and a number of tiled inserts 172B which may or may not be integrally provided with a screen or web backing member 172C. The inserts 172B are formed of a wear-resistant material such as a ceramic, ceramic composite, carbide (tungsten carbide, high carbon steel), or other material. FIG. 10 shows a photograph of inserts 172B according to some embodiments. Though the inserts 172B are shown to comprise one or more surface textures including sharp edges, depressions, grooves, and ridges, they may also be provided as smooth round spheres, circular tiles, cubes, 3-dimensionally packing or non-packing polyhedrons, etc. To manufacture the ring 172, the inserts 172B may be tightly pre-packed or otherwise arranged together in a ring-shaped mold cavity prior to filling the mold cavity with a urethane or equivalent polymer or elastomer to suspend the inserts 172B in an annular flexible matrix 172A.

Figure 19:
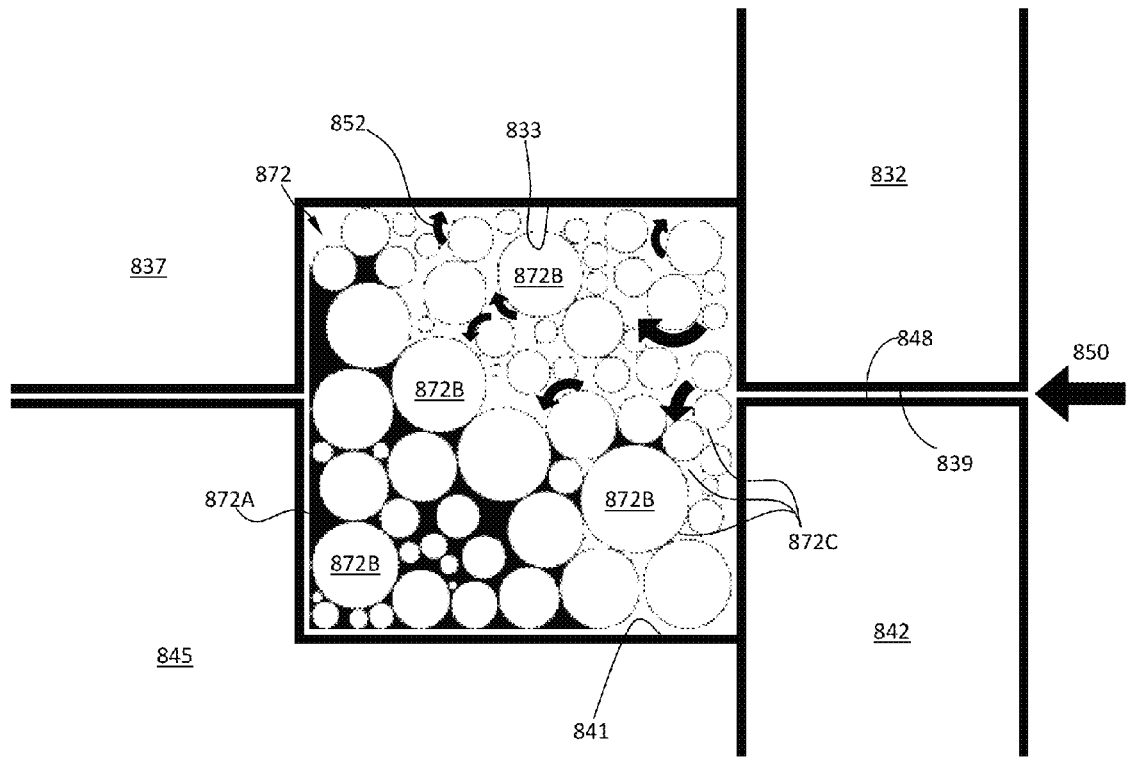

As shown in FIG. 19, after molding (or otherwise curing in-situ), an energy diffusion sealing ring 872 may be installed in one or more recessed portions 833, 841, prior to assembling a hydrocyclone. During installation, the suspension matrix 872A serves as a means for delivering the inserts 872B into said recessed portions 833, 841. During use, abrasive slurry 850 having a high radial/tangential velocity and escaping between surfaces 848, 839 of liners 832, 842 may erode all or some portions of the suspension matrix 872A away over time, leaving a tight dense packing of hard, wear-resistant inserts 872B in said recessed portions 833, 841 provided in flanges 837, 845. Without the (eroded) suspension matrix 872A, the inserts 872B form small interstices 872C between themselves, thereby creating a plurality of high-resistance three-dimensional serpentine paths where the suspension matrix 872A previously existed. It is these interstices 872C and the geometries resulting from the dimensionally-packed inserts 872B that quickly reduce the radial velocity and dissipate kinetic energy contained within slurry 852. Over time, the inserts 872B may slowly wear away as sacrificial items do, at which time the hydrocyclone can be dismantled and refurbished by sucking out the used inserts 872B and introducing a new replacement ring 872.

Figure 11:
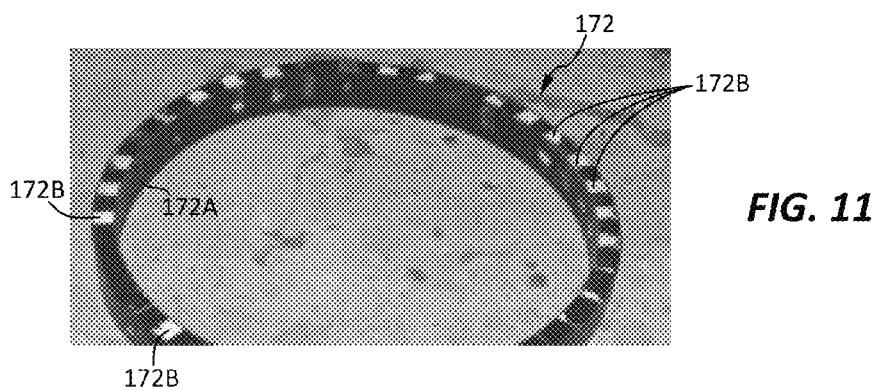
FIG. 11 is a photograph showing an energy-diffusion sealing ring incorporating the inserts shown in FIG. 10.
Figure 12:
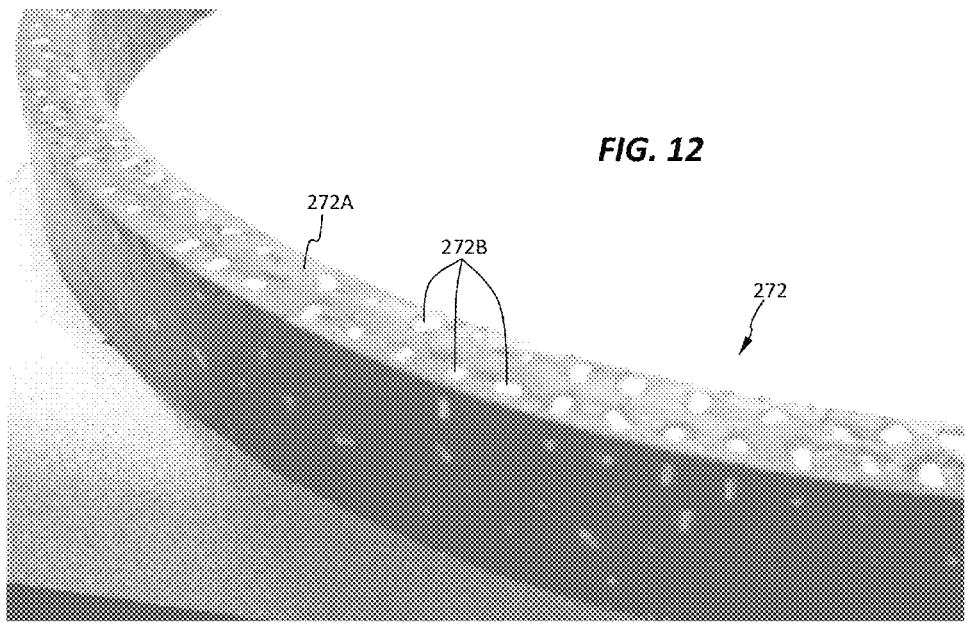
FIG. 12 is a photograph showing an energy-diffusion sealing ring incorporating inserts according to other embodiments.
Figure 13:
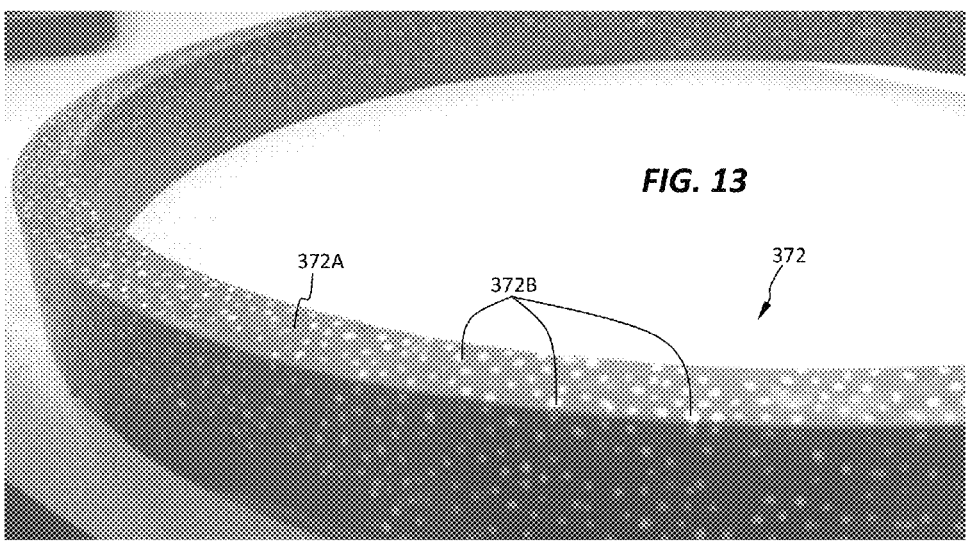
FIG. 13 is a photograph showing an energy-diffusion sealing ring incorporating inserts according to FIG. 9.

FIG. 11 is a photograph of an energy diffusion sealing ring 172 graphically shown in FIG. 8A-8D, incorporating one or more of the hexagonal prismatic honeycomb inserts 172B shown in FIG. 10. The inserts 172B are arranged orderly in series circumferentially around the ring 172. FIG. 12 is a photograph showing an energy-diffusion sealing ring 272 incorporating small cylindrical inserts 272B which are randomly configured and dispersed within a matrix suspension 272A. FIG. 13 is a photograph showing an energy-diffusion sealing ring 372 incorporating inserts 373B shown in FIG. 9.

Figure 14A:
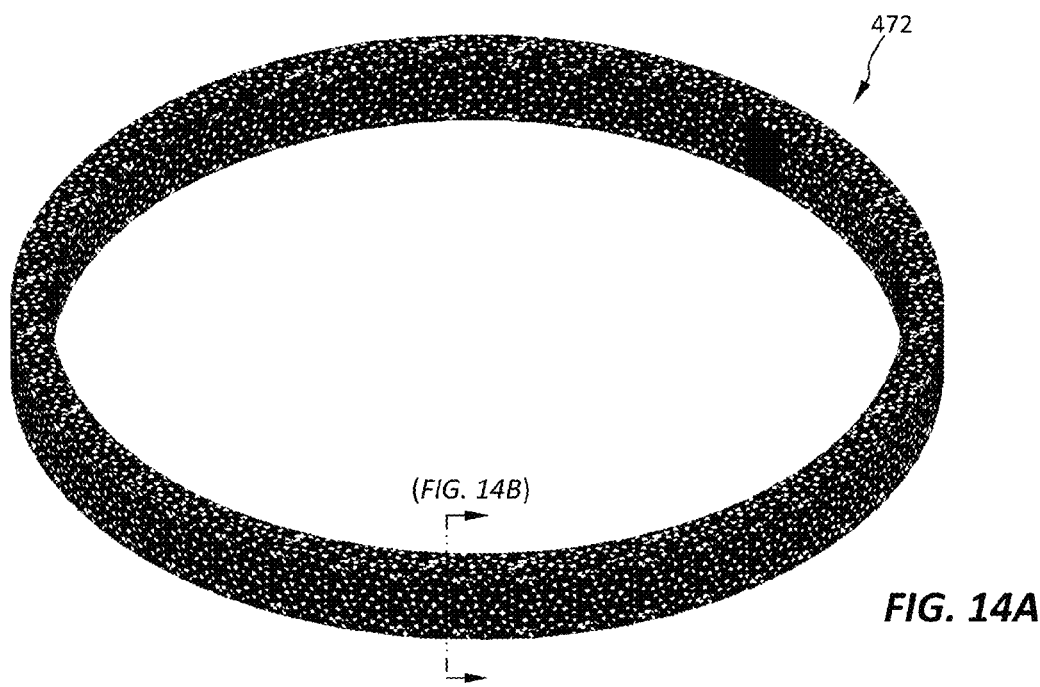
FIGS. 14A and 14B show an energy-diffusion sealing ring according to some embodiments, incorporating randomized inserts.
Figure 14B:
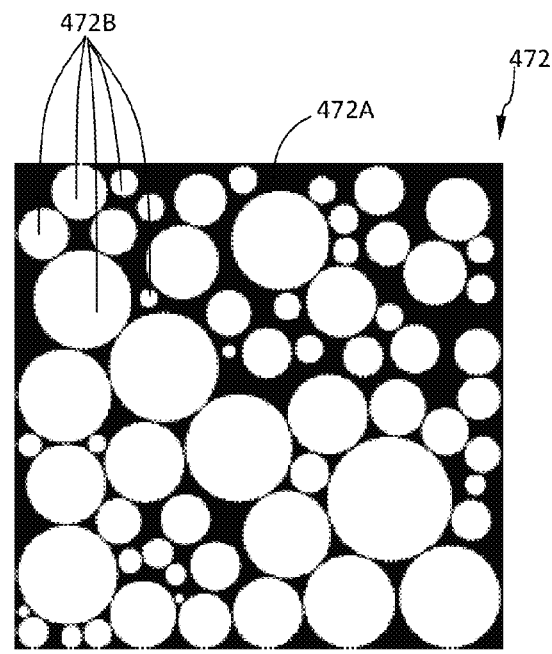
Figure 15:
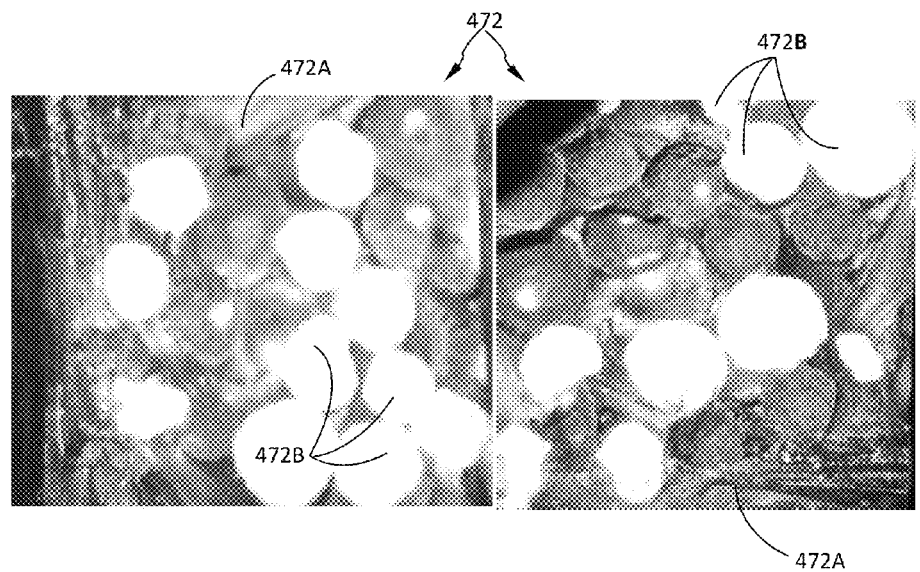
FIG. 15 is two side-by-side photographs showing close-ups of an inside portion of the energy-diffusion sealing ring according to FIGS. 14A and 14B.

FIG. 14A is a graphical depiction of an energy-diffusion sealing ring 472 incorporating a randomized distribution of hard wear inserts 472B suspended in a resilient elastomeric or polymeric matrix 472B. FIG. 14B is a cross-section of the ring 472 shown in FIG. 14A. As shown in FIG. 14B, by randomizing a size and/or shape distribution of inserts 472B, it is possible to form a tighter packing of inserts 472B which is better configured to slow radial velocities of slurry and therefore, diffuse high kinetic energies. FIG. 15 shows actual photos of a cross-section of an energy-diffusion sealing ring 472 according to some embodiments.

Figure 16:
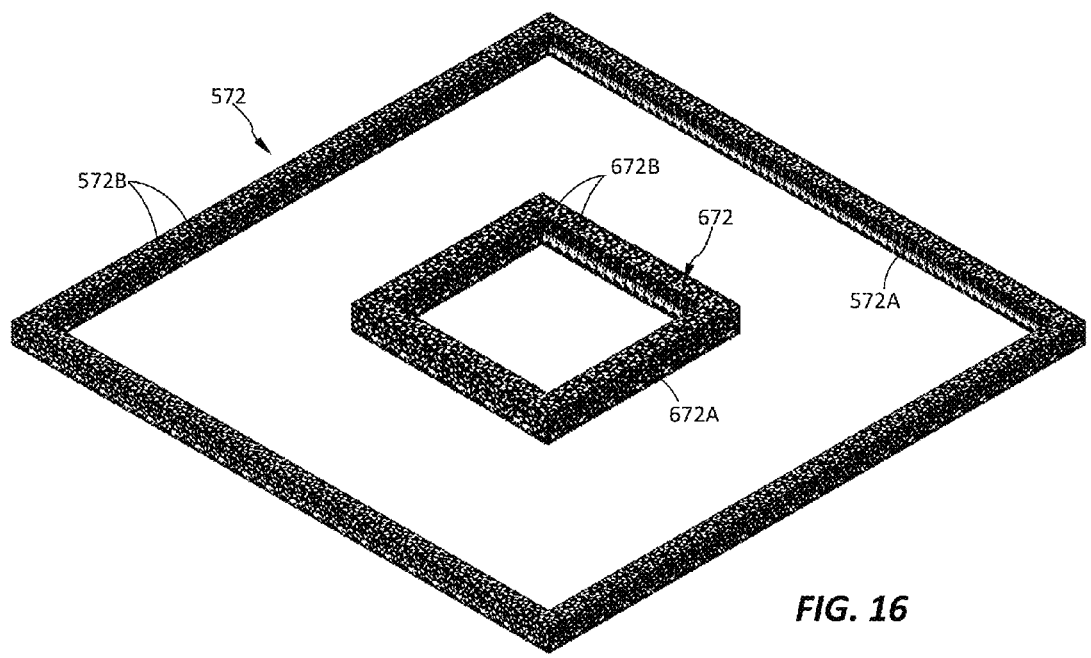
FIG. 16 shows alternative polygonal-shaped energy-diffusion sealing rings incorporating various thicknesses, sizes, and shape.

FIG. 16 illustrates two embodiments of an energy-diffusion sealing ring 572, 672—each having different perimeters and cross-sectional areas. Both rings 572, 672 comprise a number of hard (i.e., ceramic) inserts 572B, 672B suspended in an elastomeric or polymeric matrix 572A, 672A. In the particular embodiments shown, the energy-diffusion sealing rings 572, 672 comprise a rectangularly-shaped annular ring as compared to the circularly-shaped annular ring shown in FIG. 14A. Such embodiments may be particularly useful for rectangular duct joints.

Figure 17:
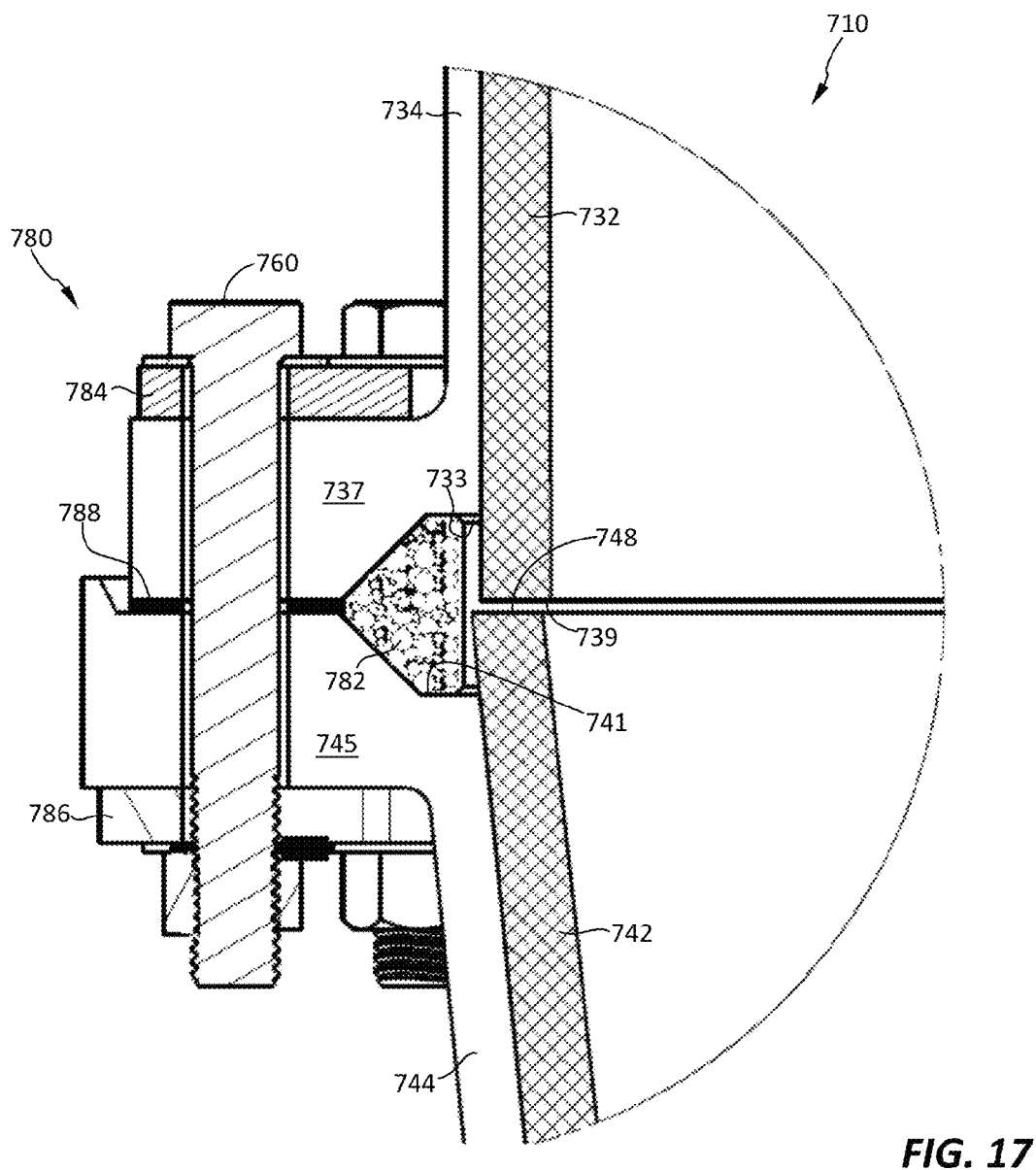
FIG. 17 shows an alternative polygonal cross-section arrangement for energy-diffusion sealing rings according to some embodiments.
Figure 18A:
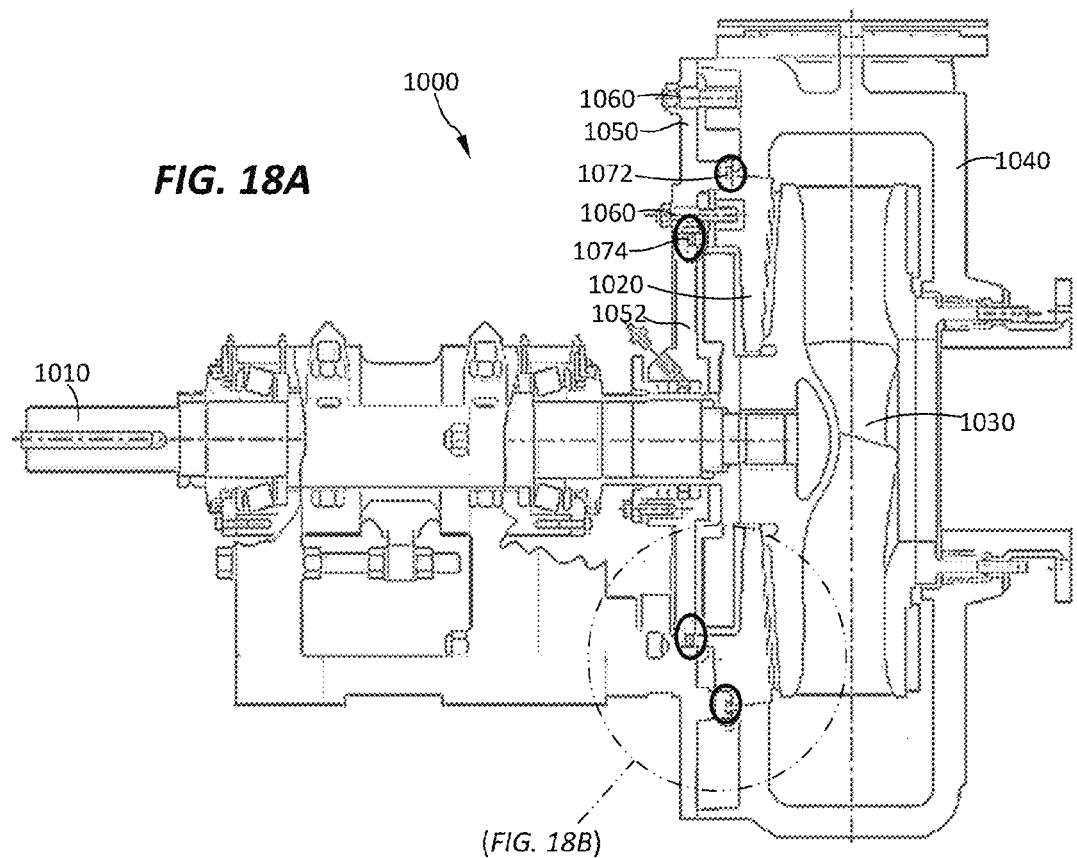
FIGS. 18A and 18B show an alternative use for energy-diffusion sealing rings according to the invention, particularly in a slurry pump; and, FIG. 19 shows an energy-diffusion sealing ring and its sacrificial properties in use.
Figure 18B:
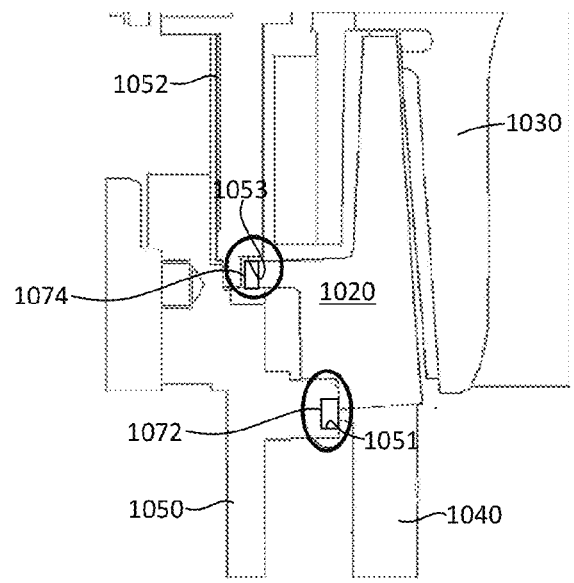

FIG. 17 depicts an energy-diffusion sealing ring 782 according to further embodiments, wherein a cross-section of the sealing ring 782 comprises a polygon resembling an irregular pentagon. It should be understood that other cross-sectional shapes such as triangles, parallelograms, trapezoids may be utilized. According to FIG. 17, cylinder 730 is mounted to a cone section 740 via a connection 780. The connection 780 comprises a cylinder lower flange 737 and a cone section upper flange 745. The cylinder lower flange 737 comprises a lower receiving portion 733 which is configured to receive an upper portion of a complementary-shaped connection energy diffusion sealing ring 782. The cone section upper flange 745 comprises a cone section upper receiving portion 741 which is configured to receive a lower portion of a complementary-shaped connection energy diffusion sealing ring 782. The sealing ring 782 serves to diffuse energy in slurry escaping between a lower surface 739 of the cylinder liner 732 and an upper surface 748 of a cone section liner 742 at high radial velocities and centrifugal forces. The cylinder liner 732 serves to protect a cylinder casing 734 from abrasive slurries within the hydrocyclone 710. The cone section liner 742 serves to protect the cone section casing 744 from abrasive slurries within the hydrocyclone 710.

A connection gasket 788 (for example, a neoprene gasket) may be placed between the cylinder lower flange 737 and the cone section upper flange 745 to seal the cone section 740 to the cylinder 730. The connection gasket 788 is protected from slurry escaping between surfaces 739 and 748 by the connection energy diffusion sealing ring 782. An upper backing plate 784 and a lower backing plate 786 are similarly provided on opposing sides of the cylinder lower flange 737 and cone section upper flange 745. A plurality of fasteners 760 applies clamping forces to the backing plates 784, 786 thereby pressing the flanges 737, 745 together and compressing the gasket 788.

According to some embodiments, an energy diffusion sealing ring 1072, 1074 may advantageously find use in a slurry pump 1000—for example, in a slurry pump 1000 having a drive shaft 1010, centrifugal dry glands seal 1020, impeller 1030, pump casing 1040, back plate 1050, hub 1052, and one or more connectors 1060 holding the back plate 1050 and hub 1052 to the centrifugal dry glands seal 1020 and pump casing 1040. Slurry under high pressure and/or radial velocity (i.e., high kinetic energy) finding its way past the dry glands seal 1020 is slowed and diffused by energy diffusion sealing rings 1072, 1074.

The advantage of the flexible suspension matrix 72A, 172A, 272A, 372A, 472A, 572A, 672A is that it permits dimensional adaptation which is not possible with a solid ceramic ring, as well as provides some initial sealing benefits. Dimensional adaptation is generally required due to the tight manufacturing tolerances of refractory ceramic parts. The polymer or elastomeric suspension matrix 72A, 172A, 272A, 372A, 472A, 572A, 672A is able to deform and provide some "play" in taking up small differences in dimensions. The matrix may be modified to fit a receiving portion 23, 31, 33, 41, 43, 51, 53, 733, 741 after manufacturing (e.g. by cutting, heating, expanding, shrinking, deforming, or otherwise altering its shape). The matrix essentially serves as a temporary sacrificial "carrier" which enables and facilitates precise depositing of the inserts 72B, 172B, 272B, 372B, 472B, 572B, 672B snuggly into the recessed portion(s) 31, 41, 51, 741; 23, 33, 43, 53, 733 during assembly. Once an energy diffusion sealing ring 72, 82, 92, 172, 272, 372, 472, 572, 672, 782, 1072, 1074 is assembled with its respective component of a hydrocyclone 10 or slurry pump 1000, the matrix 72A, 172A, 272A, 372A, 472A, 572A, 672A, can essentially be sacrificed, because the wear media is captured in said respective component. By utilizing a wear-resistant media such as ceramic for the material choice of inserts 72B, 172B, 272B, 372B, 472B, 572B, 672B, it is ensured that interstitial geometry is maintained longer, and thus energy-diffusing potential is preserved.

A contractor or other entity may provide an energy-diffusion sealing ring system or install an energy-diffusion sealing ring according to a process in whole, or in part, as shown and described. For instance, the contractor may receive a bid request for a project related to designing an energy-diffusion sealing ring, or the contractor may offer to design or provide such an apparatus for a client (e.g., a hydrocyclone or pump comprising one or more of the energy-diffusion sealing rings described, or a repair kit having multiple energy-diffusion sealing rings). The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component or whole of the devices disclosed, or of other devices used to provide said devices. The contractor may also survey a site and design or designate one or more storage areas for stacking the material used to manufacture the devices. The contractor may also maintain, modify, replace, or upgrade the provided devices. The contractor may provide such maintenance or modifications by subcontracting such services or by directly providing those services or components needed for said maintenance or modifications, and in some cases, the contractor may modify an existing hydrocyclone or pump with a "retrofit kit" to arrive at a modified hydrocyclone or pump system comprising one or more method steps, devices, or features of the sealing/energy-diffusion technologies discussed herein.

Although the invention has been described in terms of particular embodiments and applications, one of ordinary skill in the art, in light of this teaching, can generate additional embodiments and modifications without departing from the spirit of or exceeding the scope of the claimed invention. For example, it is envisaged that features of the invention may be employed in applications where there exists a cavity in a component (e.g., an O-ring groove or gasket channel) capable of accepting an elastomeric seal, wherein the elastomeric seal can potentially fail due to an abrasive substance which penetrates the interface between two assembled parts.

Accordingly, it is to be understood that the drawings and descriptions herein are proffered by way of example to facilitate comprehension of the invention and should not be construed to limit the scope thereof.

REFERENCE NUMERAL IDENTIFIERS

10 Hydrocyclone
11 Backing ring
12 Inlet
13 Volute portion
14 Vortex finder flange
15 Vortex finder
16 Overflow exit port
17 Vortex finder energy diffusion sealing ring
19 Vortex finder flange gasket
20 Inlet head
22 Inlet head liner
23 Inlet head lower receiving portion
24 Inlet head casing
25 Inlet head upper flange
27 Inlet head lower flange
28 Inlet head liner upper surface
29 Inlet head liner lower surface
30 Cylinder
31 Cylinder upper receiving portion
32 Cylinder liner
33 Cylinder lower receiving portion
34 Cylinder casing
35 Cylinder upper flange
37 Cylinder lower flange
38 Cylinder liner upper surface
39 Cylinder liner lower surface
40 First cone section
41 First cone section upper receiving portion
42 First cone section liner
43 First cone section lower receiving portion
44 First cone section casing
45 First cone section upper flange
47 First cone section lower flange
48 First cone section liner upper surface
49 First cone section liner lower surface
50 Second cone section
51 Second cone section upper receiving portion
52 Second cone section liner
53 Second cone section lower receiving portion
54 Second cone section casing
55 Second cone section upper flange
56 Underflow exit port
57 Second cone section lower flange
58 Second cone section liner upper surface
59 Second cone section liner lower surface
60 Fastener
70 First connection
72 First connection energy diffusion sealing ring
72A Suspension matrix
72B Inserts
74 First connection upper backing plate
76 First connection lower backing plate
78 First connection gasket
80 Second connection
82 Second connection energy diffusion sealing ring
84 Second connection upper backing plate
86 Second connection lower backing plate
88 Second connection gasket
90 Third connection
92 Third connection energy diffusion sealing ring
94 Third connection upper backing plate
96 Third connection lower backing plate
98 Third connection gasket
172, 272, 372, 472, 572, 672, 782, 872, 1072, 1074 Energy diffusion sealing ring
172A, 272A, 372A, 472A, 572A, 672A Suspension matrix
172B, 272B, 372B, 472B, 572B, 672B Inserts
172C Screen or web backing member
710 Hydrocyclone
730 Cylinder
732 Cylinder liner
733 Cylinder lower flange receiving portion
734 Cylinder casing
737 Cylinder lower flange
739 Cylinder liner lower surface
740 Cone section
741 Cone section upper receiving portion
742 Cone section liner
744 Cone section casing
745 Cone section upper flange
748 Cone section liner upper surface
739 Cone section liner lower surface
780 Connection
782 Energy diffusion sealing ring
784 Upper backing plate
786 Lower backing plate
788 A connection gasket
872A Suspension matrix
872B Hard, wear-resistant insert
833, 841 Recessed portion.
850 Slurry w/high radial velocity/kinetic energy
832, 842 Liner
848 Liner upper surface
839 Liner lower surface
872A Suspension matrix 837, 845 Flange
872C Interstices
852 Slurry w/reduced radial velocity/kinetic energy
1000 Pump
1010 Drive shaft
1020 Centrifugal dry glands seal
1030 Impeller
1040 Pump casing
1050 Back plate
1051 Back plate receiving portion
1052 Hub
1053 Hub receiving portion
1060 Connector(s)

What is claimed is:

1. A hydrocyclone comprising:
a first section having a first casing and a first liner which is disposed radially inwardly of the first casing;
a second section having a second casing and a second liner which is disposed radially inwardly of the second casing;
a receiving portion comprising an annular groove provided in said first and second casings; a radially inner portion of the receiving portion being defined by radially outwardly facing surfaces of the first and second liners; a radially outer portion of the receiving portion being defined by radially inwardly facing surfaces of the first and second casings; an upper portion of the receiving portion being defined by a surface of the first casing; and a lower portion of the receiving portion being defined by a surface of the second casing; thereby defining a cavity for an annular energy diffusion ring to reside, and,
an annular energy diffusion ring situated in said receiving portion, the annular energy diffusion ring comprising a resilient suspension matrix of at least one of a polymer or elastomer which is configured to be sacrificed by erosion during use, and a plurality of closely-packed hard inserts suspended within said resilient suspension matrix;
wherein in use, the annular energy diffusion ring is configured to diffuse slurry passing between said first liner and said second liner before it reaches a portion of the first or second casing.

2. A hydrocylone according to claim 1, wherein the closely-packed hard inserts are formed of a ceramic or carbide material.

3. A hydrocylone according to claim 1, wherein the resilient suspension matrix comprises one or more of a silicone, a silicone rubber, fluorosilicone rubber, a urethane, a polyurethane, ethylene propylene copolymer, a polybutadiene rubber, a butyl rubber, a nitrile rubber, a natural rubber, an isoprene rubber, a fluoroelastomer, polychloroprene, tetrafluoroethylene, tetrafluoropropylene, an acrylic or acrylic rubber, styrene butadiene rubber, or soft rubber.

4. A hydrocylone according to claim 1, wherein a configuration or distribution of the closely-packed hard inserts is randomized to allow tighter packing of the closely-packed hard inserts.

5. A hydrocylone according to claim 1, wherein said closely-packed hard inserts comprise one or more of the following: prismatic shapes, cylindrical shapes, surface textures, sharp edges, depressions, grooves, ridges, smooth round spheres, circular tiles, cubes, 3-dimensionally packing polyhedrons, 3-dimensionally non-packing polyhedrons, hexagonal shapes, honeycomb shapes.

6. A method of reducing wear in a hydrocyclone comprising a first section having a first casing and a first liner which is disposed radially inwardly of the first casing; a second section having a second casing and a second liner which is disposed radially inwardly of the second casing; a receiving portion comprising an annular groove provided in said first and second casings; a radially inner portion of the receiving portion being defined by radially outwardly facing surfaces of the first and second liners; a radially outer portion of the receiving portion being defined by radially inwardly facing surfaces of the first and second casings; an upper portion of the receiving portion being defined by a surface of the first casing; and a lower portion of the receiving portion being defined by a surface of the second casing; thereby defining a cavity for an annular energy diffusion ring, and, an annular energy diffusion ring situated in said receiving portion, the annular energy diffusion ring comprising a resilient suspension matrix of at least one of a polymer or elastomer which is configured to be sacrificed by erosion during use, and a plurality of closely-packed hard inserts suspended within said resilient suspension matrix; the method comprising:
allowing slurry to wear away portions of the resilient suspension matrix thereby forming a plurality of interstices between said closely-packed hard inserts;
maintaining the closely-packed hard inserts within the receiving portion even after portions of the resilient suspension matrix have been worn away; and,
diffusing energy of slurry moving between said first and second liners via paths of resistance created by said plurality of interstices between said closely-packed hard inserts.

7. The method according to claim 6, wherein the closely-packed hard inserts are formed of a ceramic or carbide material.

8. The method according to claim 6, wherein the resilient suspension matrix comprises one or more of a silicone, a silicone rubber, fluorosilicone rubber, a urethane, a polyurethane, ethylene propylene copolymer, a polybutadiene rubber, a butyl rubber, a nitrile rubber, a natural rubber, an isoprene rubber, a fluoroelastomer, polychloroprene, tetrafluoroethylene, tetrafluoropropylene, an acrylic or acrylic rubber, styrene butadiene rubber, or soft rubber.

9. The method according to claim 6, wherein a configuration or distribution of the closely-packed hard inserts is randomized to allow tighter packing of the closely-packed hard inserts.

10. The method according to claim 6, wherein said closely-packed hard inserts comprise one or more of the following: prismatic shapes, cylindrical shapes, surface textures, sharp edges, depressions, grooves, ridges, smooth round spheres, circular tiles, cubes, 3-dimensionally packing polyhedrons, 3-dimensionally non-packing polyhedrons, hexagonal shapes, honeycomb shapes.

* * * * *